(12) United States Patent
Ornstein et al.

(10) Patent No.: US 10,093,539 B2
(45) Date of Patent: Oct. 9, 2018

(54) METHOD FOR STORING A GAS IN A METAL ORGANIC FRAMEWORK AND DISSOLVED IN A LIQUID CARRIER

(71) Applicant: FRAMERGY, INC., Wilmington, DE (US)

(72) Inventors: Jason Mathew Ornstein, London (GB); Osman Koray Ozdemir, Cypress, TX (US)

(73) Assignee: Framergy, Inc., Wilmington, DE (US)

( * ) Notice: Subject to any disclaimer, the term of this patent is extended or adjusted under 35 U.S.C. 154(b) by 52 days.

(21) Appl. No.: 15/112,921

(22) PCT Filed: Jun. 9, 2015

(86) PCT No.: PCT/GB2015/051668
§ 371 (c)(1),
(2) Date: Jul. 20, 2016

(87) PCT Pub. No.: WO2015/189583
PCT Pub. Date: Dec. 17, 2015

(65) Prior Publication Data
US 2016/0340181 A1    Nov. 24, 2016

Related U.S. Application Data (60) Provisional application No. 62/010,123, filed on Jun. 10, 2014.

(51) Int. Cl.
*F17C 11/00* (2006.01)
*C01B 3/00* (2006.01)
(Continued)

(52) U.S. Cl.
CPC .......... *C01B 3/0084* (2013.01); *B01J 20/226* (2013.01); *C01B 3/0015* (2013.01); *C01B 21/00* (2013.01);
(Continued)

(58) Field of Classification Search
CPC ........ B01J 20/226; C01B 21/00; C01B 31/20; C01B 3/0015; C01B 3/0084; C10L 3/06;
(Continued)

(56) References Cited

U.S. PATENT DOCUMENTS 2,535,148 A    12/1950 Martin et al.
3,232,725 A    2/1966 Secord et al.
(Continued)

FOREIGN PATENT DOCUMENTS

EP    0727608 A2    8/1996
WO    2005102500 A2    11/2005

OTHER PUBLICATIONS

Search Report and Written Opinion of the International Searching Authority (ISA/EP) for PCT/GB2015/051668 dated Sep. 18, 2015.

*Primary Examiner* — Frank M Lawrence, Jr.
(74) *Attorney, Agent, or Firm* — Reising Ethington P.C.

(57) ABSTRACT

The invention relates a method for storing a solution of methane and a C2-C30 hydrocarbon, the method comprising: mixing gaseous methane and a C2-C30 hydrocarbon to provide a mixture of methane and C2-C30 hydrocarbon, wherein the mixture comprises greater than or equal to about 50 mole percent of methane; maintaining the mixture of methane and C2-C30 hydrocarbon as a liquid solution at a pressure of 30 to 150 bar within a storage vessel, wherein the storage vessel comprises a porous adsorbent framework. The invention also relates to similar methods for storing hydrogen, nitrogen and carbon dioxide. The invention also relates to the use of a non-polar solvent such as a hydrocarbon for storing a non-polar gas in a porous adsorbent framework.

20 Claims, 7 Drawing Sheets

(51) Int. Cl.
  *B01J 20/22* (2006.01)
  *C01B 21/00* (2006.01)
  *C01B 31/20* (2006.01)
  *C10L 3/06* (2006.01)

(52) U.S. Cl.
  CPC .............. *C01B 31/20* (2013.01); *C10L 3/06* (2013.01); *F17C 11/00* (2013.01); *F17C 11/005* (2013.01); *F17C 11/007* (2013.01); *C10L 2290/24* (2013.01); *F17C 2221/013* (2013.01); *F17C 2221/014* (2013.01); *F17C 2221/033* (2013.01); *Y02C 10/08* (2013.01); *Y02E 60/321* (2013.01); *Y02E 60/324* (2013.01)

(58) Field of Classification Search
  CPC .... C10L 2290/24; F17C 11/00; F17C 11/005; F17C 11/007; F17C 2221/013; F17C 2221/014; F17C 2221/033; Y02C 10/08; Y02E 60/321; Y02E 60/324
  USPC ................ 95/116, 90, 139, 130, 143; 206/7; 210/660
  See application file for complete search history.

(56) References Cited

U.S. PATENT DOCUMENTS

| | | |
|---|---|---|
| 5,862,796 A | 1/1999 | Seki et al. |
| 2003/0094002 A1* | 5/2003 | Hibino ............... F17C 5/06 62/46.1 |
| 2005/0274125 A1* | 12/2005 | Giacobbe ........... B01F 3/04439 62/46.1 |
| 2006/0008392 A1* | 1/2006 | Graham .............. F17C 11/00 422/168 |
| 2011/0126708 A1* | 6/2011 | Rodriguez Navarro ..... B01D 53/02 95/130 |

* cited by examiner

METHOD FOR STORING A GAS IN A METAL ORGANIC FRAMEWORK AND DISSOLVED IN A LIQUID CARRIER

This application claims the benefit of U.S. provisional application No. 62/010,123, filed on Jun. 10, 2014, the entire contents of which are incorporated by reference.

FIELD OF THE INVENTION

The invention relates to a method of storing gases, in particular to methods of storing methane, hydrogen, carbon dioxide, or nitrogen. The methods of the invention provide a way of increasing deliverable gas capacity of a porous adsorbent framework (such as a metal organic framework).

BACKGROUND OF THE INVENTION

Methods of storing natural gas which includes methane as a main component have been known for many years; for example see U.S. Pat. No. 2,535,148 and U.S. Pat. No. 3,232,725. More recently, the use of metal organic frameworks (MOFs) for storing gas including methane as a main component has been proposed in for example U.S. Pat. No. 5,862,796 & EP 0 727 608 A2. For example, U.S. Pat. No. 5,862,796 describes a gas storage apparatus for use in storing a gas containing methane as its main component which is hereby incorporated by reference in its entirety. The apparatus includes a pressure vessel accommodating therein an organometallic complex (a MOF). Storage of the gas takes place by adsorption and retention of the gas inside the MOF at increased pressure and normal/ambient temperature. Further, for releasing the gas from the apparatus (i.e. desorption of the gas from the MOF), the inside pressure of the vessel is reduced, whereby the gas is desorbed from the MOF to be discharged out of the apparatus for use in a certain application. In general MOFs are able to store methane efficiently at elevated pressure and normal temperature conditions within a relatively limited volume.

There is however a need to increase further the storage capacity of porous adsorbent frameworks such as metal organic frameworks and increase the deliverable capacity of such porous adsorbent frameworks.

DESCRIPTION OF THE INVENTION

According to one aspect, the invention provides a method for storing a solution of methane and a C2-C30 hydrocarbon, the method comprising:
mixing gaseous methane and a C2-C30 hydrocarbon to provide a mixture of methane and C2-C30 hydrocarbon, wherein the mixture comprises greater than or equal to about 50 mole percent of methane;
maintaining the mixture of methane and C2-C30 hydrocarbon as a liquid solution at a pressure of 30 to 150 bar within a storage vessel, wherein the storage vessel comprises a porous adsorbent framework.

A C2-C30 hydrocarbon such as propane, n-butane, n-hexane, or n-decane, cyclodecane, or dodecane employed in the methods described herein acts a solvent. The use of a C2-C30 w hydrocarbon achieves significantly higher gas adsorption capacity per volume, in comparison to similar methods that do not employ such a hydrocarbon. Equally, the use of a C2-C30 hydrocarbon achieves significantly higher gas deliverable capacity per volume, in comparison to similar methods that do not employ such a hydrocarbon. For example, the use of a C2-C30 hydrocarbon achieves methane adsorption capacity per volume under conditions of elevated pressure and normal temperature that is significantly greater than that achieved previously. Accordingly, gases such as methane may be efficiently stored within a relatively limited volume.

In one aspect, the invention provides a method of storing a solution of hydrogen and a C2-C30 hydrocarbon, the method comprising:
mixing gaseous hydrogen and a C2-C30 hydrocarbon to provide a mixture of hydrogen and C2-C30 hydrocarbon, wherein the mixture comprises greater than or equal to about 50 mole percent of hydrogen;
maintaining the mixture of hydrogen and C2-C1030 hydrocarbon as a liquid solution at a pressure of 30 to 150 bar within a storage vessel, wherein the storage vessel comprises a porous adsorbent framework.

In one aspect, the invention provides a method of storing a solution of carbon dioxide and a C2-C30 hydrocarbon, the method comprising:
mixing gaseous carbon dioxide and a C2-C30 hydrocarbon to provide a mixture of carbon dioxide and C2-C30 hydrocarbon, wherein the mixture comprises greater than or equal to about 50 mole percent of carbon dioxide;
maintaining the mixture of carbon dioxide and C2-C30 hydrocarbon as a liquid solution at a pressure of 30 to 150 bar within a storage vessel, wherein the storage vessel comprises a porous adsorbent framework.

In one aspect, the invention provides a method of storing a solution of nitrogen and a C2-C30 hydrocarbon, the method comprising:
mixing gaseous nitrogen and a C2-C30 hydrocarbon to provide a mixture of nitrogen and C2-C30 hydrocarbon, wherein the mixture comprises greater than or equal to about 50 mole percent of nitrogen;
maintaining the mixture of nitrogen and C2-C30 hydrocarbon as a liquid solution at a pressure of 30 to 150 bar within a storage vessel, wherein the storage vessel comprises a porous adsorbent framework.

In one embodiment, the porous adsorbent framework is selected from a metal organic framework, a nano-porous material, a porous polymer network, a silica, an activated carbon, alumina, or a zeolite, preferably the porous adsorbent framework is a metal organic framework.

In one embodiment, the solution of methane and C2-C30 hydrocarbon is adsorbed in the porous adsorbent framework.

In one embodiment, the C2-C30 hydrocarbon is a C2-C10 hydrocarbon.

In one embodiment, the C2-C30 hydrocarbon is a non-polar hydrocarbon, such as a C2-C10 alkane. Suitable alkanes include ethane, propane, butane (n-butane, t-butane, i-butane), pentane, hexane (n-hexane, cyclohexane), heptane, octane, nonane, decane, and mixtures thereof. For example, the hydrocarbon may be propane, n-butane, n-hexane, cyclohexane, n-decane, or cyclodecane. Preferably, the alkane is a C3-C10 alkane, or C3-C5 alkane, preferably propane, n-butane, or mixtures thereof. Other suitable hydrocarbons include benzene, C2-C10 alkenes, and C2-C5 alkanes. In methods for storing hydrogen, carbon dioxide, or nitrogen, methane is also a suitable hydrocarbon.

Throughout the specification, reference to "other gas" or "other gases" is a generic reference to any non-polar gas such as hydrogen, nitrogen and carbon dioxide.

The inventors have discovered that the presence of a hydrocarbon can improve gas retention (storage capacity), for example methane retention (storage capacity), within a porous adsorbent framework. Without wishing to be bound by theory, it is hypothesised that methane (and other gases) are highly soluble in hydrocarbon mixtures, which form a solute gas and hydrocarbon solvent within the porous adsorbent framework. This is achievable at suitable pressures (e.g. ~30-65 bar) and temperatures (~260-323° K) for storing hydrocarbons such as methane or methane-containing gases (e.g. natural gas). The hydrocarbon perhaps acts as a solvent which dissolves the methane (or other gas), thus increasing the storage capacity of the porous adsorbent framework as well as increasing the amount of deliverable methane (or other gas) from the porous adsorbent framework. It is also hypothesised that the presence of an additional hydrocarbon molecule reduces the repulsion between methane (or other gas) thereby allowing more methane molecules to fill the same sized space. Hence, the absorption capacity of the porous material is increased.

As a result, the present invention allows the same volume of methane (or other gas) to be stored at reduced pressure, thus providing a practical advantage.

Moreover, a further benefit has been identified. The porous adsorbent framework has been found to retain the hydrocarbon during desorption from the framework. For example, when using a mixture of methane and propane, the methane is desorbed first before the propane is desorbed. In fact, it has been discovered that it is possible to desorb completely the methane gas from the porous adsorbent framework before the propane begins to desorb. The use of higher molecular weight hydrocarbons (such as n-butane) leads to a greater difference in elution times (compared to propane). This difference in elution times is most likely based on the relative size, polarity, and polarizability of the mixture of components. It is therefore possible to release methane (or other gases) from a porous adsorbent framework without releasing the hydrocarbon. Ideally to optimise this the porous adsorbent framework should comprise pores that are large enough to encapsulate the solvent hydrocarbon molecules but small enough to provide sufficient Van der Waals interactions to retain the solvent hydrocarbon molecules at suitable discharge pressures (e.g. ~2-5 bar).

The invention also allows specific combinations of porous adsorbent frameworks, gases, and hydrocarbons to be designed that most effectively utilise the unique relationship between hydrocarbon molecular size, methane (other gas) molecular size, and framework pore diameter.

In particular, the inventors have discovered a unique relationship between the pore size/shape of porous adsorbent frameworks, e.g. molecular organic frameworks, and different types of hydrocarbon. For example, the skilled person would be aware that molecular organic frameworks contain pores having different shapes and sizes depending on the metal clusters and ligands employed to prepare the MOF. MOF's may comprise among others cage type pores or channel type pores. These terms are used in the art to describe different shaped pores. With the assistance of single crystal X-ray diffraction and powder X-ray diffraction, the skilled person is readily able to determine cage type and channel type structures and determine between them.

What the inventors have surprisingly discovered is that the method of the present invention can be optimised by employing hydrocarbons that correspond to the size/shape of the MOF being used.

In one embodiment, the method of the present invention concerns a porous adsorbent material, such as a metal organic framework, having a cage type pore. This type of MOF comprises polyhedral cages. Cage type MOFs can have very different sized cages measured as the free diameter. For example, free diameters can be as small as 5 Angstroms as well as exceed 60 Angstroms. The inventors have found cage type frameworks comprising different sized cages, i.e. different free diameters, perform better with selected hydrocarbons.

In general, it has been found that frameworks having relatively smaller cages (smaller free diameters, e.g. a free diameter of less than about 20 Angstroms) perform better in combination with a relatively short linear hydrocarbon, e.g. a C2-C6 hydrocarbon, or a cyclic hydrocarbon. Suitable groups of hydrocarbons include C2-C6 linear alkanes and C6-C30 cycloalkanes (such as C6-C14 cycloalkanes, C8-C12 cycloalkanes, or C8-C10 cycloalkanes). Specific alkanes suitable for this purpose include propane, n-butane, and cyclodecane. Examples of other suitable free diameters include less than about 15 Angstroms, or less than about 10 Angstroms. Suitable lower limits include free diameters of greater than or equal to about 4 Angstroms, about 6 Angstroms, or about 8 Angstroms. For example, the above-mentioned hydrocarbons provide excellent results in combination with a framework comprising cage type pores having a free diameter ranging from about 8 to about 10 Angstroms.

Additionally, it has been found that frameworks having relatively large cages (larger free diameters, e.g. a free diameter of greater than about 20 Angstroms) perform better in combination with relatively longer linear hydrocarbons, e.g. a linear hydrocarbon having greater than 6 carbon atoms. Suitable hydrocarbons include linear C8-C30 alkanes. Specific alkanes suitable for this purpose include n-dodecane. Examples of other suitable free diameters include greater than or equal to about 25 Angstroms, greater than or equal to about 30 Angstroms, greater than or equal to about 35 Angstroms.

Without wishing to be bound by theory, it is believed that the size of these hydrocarbons more appropriately fit into the size of the cage like structure of the MOF's pore cavity. Lower alkyl linear hydrocarbons and cyclo-hydrocarbons are suitable with frameworks having relatively small pores because their short chains or their cyclic structure fit into the relatively small volume within the pore cavity.

For example, it has been discovered that both propane and cyclo-decane provide excellent results in relation to UiO-66 (a cage type MOF). UiO-66 is a porous crystalline MOF, composed of Zr clusters and organic linkers to form 3D cages, which are the basic building blocks of the MOFs. The pores of UiO-66 have a diameter of about 8-10 Angstroms. Hence, C8-C12 cycloalkanes (e.g. cyclodecane) and C2-C6 linear alkanes (e.g. propane and n-butane) are particularly suitable for use with a porous adsorbent material having pores with a diameter from about 7 to about 11 Angstroms, e.g. from about 8 to about 10 Angstroms.

Also, it has been discovered that n-dodecane provides excellent results in relation to PCN-777 (a cage type MOF with large pores). PCN-777 has very large pores—free diameter measured at about 38 Angstroms). Hence, C8-C16 linear hydrocarbons (such as C8-C16 n-alkanes, e.g. dodecane) are particularly suitable for use with a porous adsorbent framework having pores with a free diameter from about 33 Angstroms to about 43 Angstroms, e.g. from about 36 Angstroms to about 40 Angstroms.

In one embodiment, the method of the present invention concerns a porous adsorbent material, such as a metal organic framework, having a channel type pore.

It has also been discovered that the adsorption of methane (or other gas) into a channel type MOF is improved by employing a relatively long linear hydrocarbon, such as a C6-C30 n-alkane. For example, suitable linear hydrocarbons include n-octane and n-decane. The preferred linear alkane in this context is n-decane. This type of MOF comprises one dimensional channels leading to a free diameter of from about 5 Angstroms to about 20 Angstroms. The internal surfaces of these channels can trap gas molecules to form high gas absorption capacity, because of their large surface area.

Without wishing to be bound by theory, it is believed that C6-C30 n-alkanes, due to their size and shape, more appropriately fit into the MOF's pore cavity.

For example, it has been discovered that n-decane provides excellent results in relation to PCN-250 (a channel type MOF). PCN-250 forms a porous solid permeated by 1D channels in diameter (about 11 Angstroms) resulting from Fe metal clusters and organic linkers. The channel size is suitable for binding methane molecules on its surface because of high surface area (measured by BET). Hence, C6-C30 or C8-C16 n-alkanes (e.g. n-decane) are particularly suitable for use with a porous adsorbent framework having channel type pores with a free diameter from about 5 Angstroms to about 20 Angstroms, from about 8 Angstroms to about 14 Angstroms, or from about 10 Angstroms to about 12 Angstroms, e.g. about 11 Angstroms.

It has been discovered that n-dodecane provides excellent results in relation to PCN-777 (a channel type MOF). As reported in the literature (Feng et al in Angew. Chem. Int. Ed. 2014, 53, 1-7), PCN-777 possesses very large ("ultralarge") pores compared to other MOFs. For example, PCN-777 has a void volume of 2.82 $cm^3/g$ compared to UiO-66 which has a void volume of 0.47 $cm^3/g$ and PCN-250(Fe) which has a void volume of 0.61 $cm^3/g$. Likewise, PCN-777 has a free diameter of 38 Angstrom compared to 11 Angstroms for PCN-250 and 8-10 Angstroms for UiO-66. The observation that a larger hydrocarbon, dodecane, provides excellent results for a MOF having ultralarge pores is consistent with the theory presented herein in order to explain the improved performance of certain porous adsorbent materials in combination with certain hydrocarbons.

The work carried out by the inventors has also led to the realisation that the use of certain types of hydrocarbons provides excellent results in certain types of metal organic frameworks.

In particular, a C3-C4 alkane (e.g. propane) or a C6-C12 cycloalkane (e.g. cyclodecane) is particularly useful in a metal organic framework having the same or similar properties to UiO-66. For example, they have been found to be particularly useful in a metal organic framework having:
  (i) a free diameter of from about 7 Angstroms to about 11 Angstroms; from about 8 Angstroms to about 10 Angstroms; and/or
  (ii) a pore opening of from about 4 Angstroms to about 8 Angstroms, from about 5 Angstroms to about 7 Angstroms, about 6 Angstroms; and/or
  (iii) a void volume from about 0.3 $cm^3/g$ to about 0.7 $cm^3/g$, from about 0.4 $cm^3/g$ to about 0.6 $cm^3/g$; and/or
  (iv) a cage type pore structure; and/or
  (v) zirconium inorganic cornerstones which have at least 20 coordination sites; and/or
  (vi) $Zr_6C_{32}$ cornerstones; and/or
  (vii) a surface area of at least 1020 $mg^2/g$.

In particular, a C8-C12 n-alkane (e.g. n-decane) is particularly useful in a metal organic framework having the same or similar properties to PCN-250(Fe). For example, they have been found to be particularly useful in a metal organic framework having:
  (i) a free diameter of from about 5 Angstroms to about 20 Angstroms, from about 8 Angstroms to about 14 Angstroms, from about 10 Angstroms to about 12 Angstroms, or about 11 Angstroms; and/or
  (ii) a pore opening of from about 7 Angstroms to about 11 Angstroms, from about 8 Angstroms to about 10 Angstroms; and/or
  (iii) a void volume of from about 0.3 $cm^3/g$ to about 0.9 $cm^3/g$, from about 0.5 $cm^3/g$ to about 0.7 $cm^3/g$; and/or
  (iv) a channel type pore structure; and/or
  (v) iron inorganic cornerstones; and/or
  (vi) $Fe_3O$ cornerstones; and/or
  (vii) a surface area of at least 1020 $mg^2/g$.

In particular, a C10-C14 n-alkane (e.g. n-dodecane) is particularly useful in a metal organic framework having the same or similar properties to PCN-777. For example, they have been found to be particularly useful in a metal organic framework having:
  (i) a free diameter of from about 25 Angstroms to about 51 Angstroms, from about 33 Angstroms to about 43 Angstroms, from about 36 Angstroms to about 40 Angstroms, or about 38 Angstroms; and/or
  (ii) a void volume of from about 1.8 $cm^3/g$ to about 3.8 $cm^3/g$, from about 2.5 $cm^3/g$ to about 3.1 $cm^3/g$, or about 2.8 $cm^3/g$; and/or
  (iii) a cage type pore structure; and/or
  (iv) zirconium inorganic cornerstones each having at least 20 coordination sites; and/or
  (v) $Zr_6O_4OH$ cornerstones; and/or
  (vi) a surface area of at least 1500 $mg^2/g$.

Also, the method of the present invention can be optimised by employing appropriate combinations of methane (other gas) and hydrocarbon. For example, one specific combination is methane and propane (hydrocarbon). Methane has a kinetic diameter of approximately 3.8 Angstroms. Propane has a kinetic diameter of approximately 4.3 Angstrom. A porous adsorbent framework comprising pores having a pore diameter ranging from about 8 to about 11 Angstroms and having a pore opening of about 6.0 Angstroms provides the required pore size such that the pores are large enough to encapsulate propane and also small enough to retain propane after the methane is released. The pores are not however so small that they prevent the methane from releasing at suitable discharge pressures.

A suitable porous adsorbent framework having the required pore size for this specific combination is UiO-66 (a Zr-MOF first described in WO2009/133366 A2 (Example 1; FIG. 4); also described in JACS, 2008, 130, 13850-13851; and further described in Chem. Commun., 2013, 49, 9449-9451; all hereby incorporated by reference. UiO-66 has pore diameter ranging from about 8 to about 11 Angstroms and a pore opening of 6.0 Angstroms).

An alternative combination is methane and n-butane (hydrocarbon). Methane has a kinetic diameter of about 3.8 Angstroms. N-butane has a kinetic diameter of about 4.3 Angstroms. A porous adsorbent framework comprising pores having a pore diameter ranging from about 11.5 to about 23 Angstroms and having a pore opening of 8.0 Angstroms provides the required pore size such that the pores are large enough to encapsulate n-butane and also small enough to retain n-butane after the methane is released. The pores are not however so small that they prevent the methane from releasing at suitable discharge pressures.

A suitable porous adsorbent framework having the required pore size for this specific combination is UiO-67 (a Zr-MOF first described in WO2009/133366 A2; Example 2; FIG. 5; also described in JACS, 2008, 130, 13850-13851; and further described in Chem. Commun., 2013, 49, 9449-

9451; all hereby incorporated by reference). UiO-67 has pore diameter ranging from about 11.5 to about 23 Angstroms and a pore opening of 8.0 Angstroms)

Generally, it has been discovered that the optimum pore diameter of the porous adsorbent framework is at least 1.5 times the kinetic diameter of methane (or other gas), preferably the pore diameter of the porous adsorbent framework is from about 1.5 times to about 2.5 times the kinetic diameter of methane (or other gas), more preferably about 2 times the kinetic diameter of methane (or other gas).

In one embodiment in which methane is being stored, the porous adsorbent framework has a pore diameter of from about 6 Angstroms to about 13 Angstroms, from about 7.5 to about 11.5 Angstroms, from about 7 to about 9 Angstroms, from about 10 to about 12 Angstroms, about 8 Angstroms, or about 11 Angstroms.

In one embodiment, the solution of methane (or other gas) and hydrocarbon is adsorbed in the porous adsorbent material.

In one embodiment, mixing gaseous methane and a C2-C10 hydrocarbon comprises feeding a C2-C10 hydrocarbon into a storage vessel comprising a porous adsorbent framework, and then feeding methane into the storage vessel to produce a mixture of methane and C2-C10 hydrocarbon.

In one embodiment, mixing gaseous methane and a C2-C10 hydrocarbon is carried out before the mixture of methane and C2-10 hydrocarbon is fed into the storage vessel.

In one embodiment, the mixture of methane and C2-C10 hydrocarbon comprises from about 50 to about 80 mole percent of methane.

In one embodiment, the solution of methane and C2-C10 hydrocarbon is maintained at a pressure below the vapour pressure of the C2-C10 hydrocarbon.

In one embodiment, the C2-C10 hydrocarbon is fed into the storage vessel at a pressure below the vapour pressure of the C2-C10 hydrocarbon.

In one embodiment, the C2-C10 hydrocarbon is fed into the storage vessel at elevated pressure, for example at a pressure of from about 30 bar to about 150 bar, preferably at from about 60 to about 65 bar.

In one embodiment, the C2-C10 hydrocarbon is fed into the storage vessel at room temperature.

In one embodiment, the solution of methane and C2-C10 hydrocarbon is maintained at a pressure from about 30 bar to about 65 bar.

In one embodiment, the solution of methane and C2-C10 hydrocarbon is maintained at room temperature.

In one embodiment, the method further comprises releasing the methane from the storage vessel.

In one embodiment, the methane is released without releasing the C2-C10 hydrocarbon from the storage vessel.

In one embodiment, the methane is released to a relatively lower pressure than in the storage vessel, for example to a pressure from about 2 to about 5 bar, or to atmospheric pressure.

In one embodiment, the porous adsorbent framework is a metal organic framework comprising molecular pores having a pore diameter of over 3.8 Angstroms.

In one embodiment, the porous adsorbent framework is a metal organic framework, preferably a metal organic framework comprising bi-, tri-, or tetra-carboxylate ligands. For example, the metal organic framework may be UiO-66 or UiO-67.

In one embodiment, the C2-C10 hydrocarbon is propane and the propane is fed to the storage vessel at a pressure of less than 117 psi, less than or equal to 100 psi, less than or equal to 80 psi, or less than or equal to 60 psi. For example, the porous adsorbent framework may be UiO-66.

In one embodiment, the C2-C10 hydrocarbon is n-butane and the n-butane is fed to the storage vessel at a pressure of less than 20 psi, less than or equal to 15 psi, less than or equal to 12 psi, or less than or equal to 10 psi. For example, the porous adsorbent framework may be UiO-67.

The present invention has been mainly described in the context of storing methane. However, the above methods of the present invention may also be used to store other gases including to store hydrogen, nitrogen, or carbon dioxide.

In one aspect, the invention relates to a method for storing a solution of hydrogen and a C1-C10 hydrocarbon, the method comprising:
  mixing gaseous hydrogen and a C1-C10 hydrocarbon to provide a mixture of hydrogen and C1-C10 hydrocarbon, wherein the mixture comprises greater than or equal to about 50 mole percent of hydrogen;
  maintaining the mixture of hydrogen and C1-C10 hydrocarbon as a liquid solution at a pressure of 30 to 150 bar within a storage vessel, wherein the storage vessel comprises a porous adsorbent framework.

In one aspect, the invention relates to a method for storing a solution of carbon dioxide and a C1-C10 hydrocarbon, the method comprising:
  mixing gaseous carbon dioxide and a C1-C10 hydrocarbon to provide a mixture of carbon dioxide and C1-C10 hydrocarbon, wherein the mixture comprises greater than or equal to about 50 mole percent of carbon dioxide;
  maintaining the mixture of carbon dioxide and C1-C10 hydrocarbon as a liquid solution at a pressure of 30 to 150 bar within a storage vessel, wherein the storage vessel comprises a porous adsorbent framework.

In one aspect, the invention relates to a method for storing a solution of nitrogen and a C1-C10 hydrocarbon, the method comprising:
  mixing gaseous nitrogen and a C1-C10 hydrocarbon to provide a mixture of nitrogen and C1-C10 hydrocarbon, wherein the mixture comprises greater than or equal to about 50 mole percent of nitrogen;
  maintaining the mixture of nitrogen and C1-C10 hydrocarbon as a liquid solution at a pressure of 30 to 150 bar within a storage vessel, wherein the storage vessel comprises a porous adsorbent framework.

In one aspect, the invention relates to the use of a non-polar solvent for storing a non-polar gas in a porous adsorbent framework.

The non-polar solvent may be a non-polar hydrocarbon such as a C1-C10 hydrocarbon. The non-polar solvent may be a C1-C10 alkane, an aromatic hydrocarbon, or a C1-C10 alkene. Specific examples are referred to above and include propane, n-butane, and benzene.

The non-polar gas may be any non-polar gas including but not limited to methane, hydrogen, nitrogen, and carbon dioxide.

If the gas is methane, the non-polar solvent is preferably a C2-C10 hydrocarbon such as propane, n-butane, n-decane, or cyclo-decane.

If the gas is carbon dioxide, the non-polar solvent is preferably benzene.

If the gas is nitrogen or hydrogen, the non-polar solvent is preferably a C1-C10 hydrocarbon.

The porous adsorbent framework is preferably a metal organic framework.

The methods of the invention employ a storage vessel. Any suitable vessel is appropriate such as, but not limited to, a storage tank.

The invention will now be described further with reference to the following non-limiting examples and the accompanying Figures, in which:

BRIEF DESCRIPTION OF THE FIGURES

FIG. 7a illustrates the meaning of the term "free diameter". FIG. 7b illustrates the meaning of the term "pore opening". FIG. 7e illustrates the meaning of the term "pore volume".

EXAMPLES

Tests were conducted to evaluate if hydrocarbons could enhance uptake of natural gas in porous sorbents.

Example 1

The test sorbents were exposed to selected hydrocarbons (alkanes) at room temperature, below their vapor pressure. Following, methane gas was adsorbed at 65 bar. The concept is based on the high solubility of methane in alkane species.

Over their vapor pressure, selected alkanes (propane and n-butane) changed phase from gas to liquid state within the pores of the test adsorbents and increased adsorbent's methane uptake by dissolving adsorbed gaseous methane. This novel approach provided a new mechanism for methane uptake in addition to the physisorption mechanism.

The test system is composed of two subsystems: (i) gas uptake subsystem, (ii) gas analysis subsystem.

The gas uptake subsystem includes test gases, fluid system components, electrical connections and sensors. The gas analysis subsystem includes gas chromatograph with a flame ionization detector (FID), chromatograph column, GC carrier gas, GC hydrogen gas and fluid system connections.

Using the gas uptake test system, the test gases were accumulated in a 500 ml stainless steel container before they were exposed to the adsorbent. The container was composed of two NPT ports for integration of a pressure transducer and for connecting to a stainless steel column, which held the tested adsorbent. Gas flow from the container was made while isolating the gas from the source (gas cylinder) by attaching a three-way valve at the container's outlet.

The gas uptake tests were conducted in two steps. First, the selected alkane gas was accumulated in the container and the pressure was recorded by the pressure transducer. Following, the tested adsorbent was exposed to the accumulated alkane gas by directing the three-way valve towards the stainless steel test column. The test column volume was 1 ml, which was sufficient to store 220-260 mg of adsorbent (UIO-66 and UIO-67). After exposure to the alkane gas, methane gas set at 65 bar was directed to the test column. Each adsorption step took 15 minutes, during this time frame pressure drop in the test column was observed representing gas uptake by the adsorbent.

Following the gas uptake test, the test column at high pressure (60-65 bar) was removed from the container and connected to a gas chromatograph's sample port. The gas chromatograph was equipped with a capillary column, which was specific to the hydrocarbons tested. The amount of gas released to atmospheric pressure was quantified by the gas chromatograph and test results were reported as follows:

| UIO-66 (258.4 mg) | W[g] | GC Integration Area (GCIA) | | | Δ ΔGCIA CH$_4$ [A/A$_0$] (%) | Δ ΔW [W/W$_0$] (%) |
| --- | --- | --- | --- | --- | --- | --- |
| | | Methane (CH$_4$) | Propane (C$_3$H$_8$) | n-butane (C$_4$H$_{10}$) | | |
| Desorbed 4 hrs at 70 deg C. | 95.504 | 388528 | | 0 | 0.00% | 0.07% |
| Adsorbed (Methane only at 65 bar) | 95.5749 | | | | | |
| Desorbed 4 hrs at 70 deg C. | 95.5036 | 458581 | 268024 | 0 | 18.03% | 0.10% |
| Adsorbed (Propane at 60 PSI and methane at 65 bar) | 95.6029 | | | | | |
| Desorbed 4 hrs at 70 deg C. | 95.5037 | 372874 | 0 | 17109 | −4.03% | 0.10% |
| Adsorbed (n-butane at 20 PSI and methane at 65 bar) | 95.597 | | | | | |
| Desorbed 4 hrs at 70 deg C. | 95.5041 | 255538 | 530136 | | −34.23% | 0.12% |
| Adsorbed (Propane at 117 PSI and methane at 65 bar) | 95.615 | | | | | |
| UIO-67 (224.3 mg) | | | | | | |
| Desorbed 4 hrs at 120 deg C. | 92.2765 | 412157 | | 0 | 0.00% | 0.08% |
| Adsorbed (Methane only at 65 bar) | 92.3525 | | | | | |
| Desorbed 4 hrs at 120 deg C. | 92.2741 | 328074 | 281006 | 0 | −20.40% | 0.13% |
| Adsorbed (Propane at 60 PSI and methane at 65 bar) | 92.3928 | | | | | |
| Desorbed 4 hrs at 120 deg C. | 92.2734 | 408346 | 0 | 27795 | −0.92% | 0.12% |
| Adsorbed (n-butane at 20 PSI and methane at 65 bar) | 92.3807 | | | | | |

-continued

Figure 1:
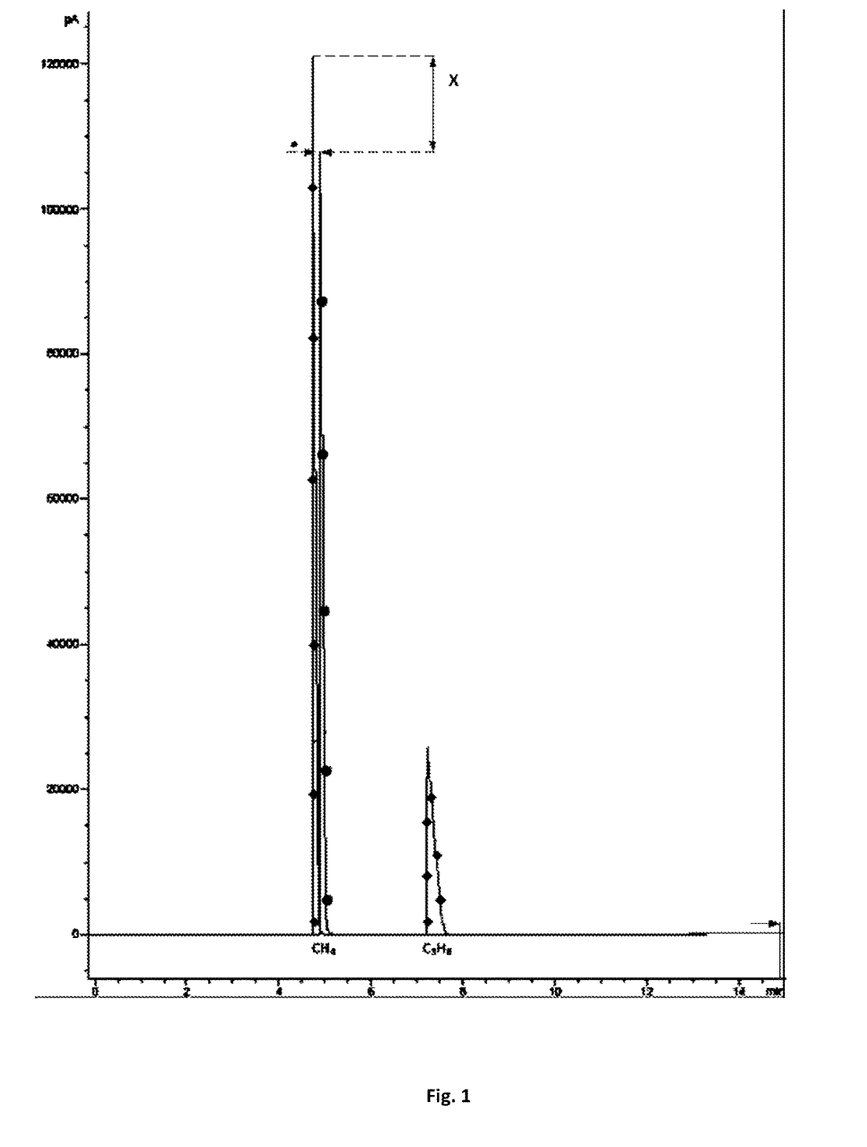
FIG. 1 is a GC chromatogram comparing desorbed methane from a metal organic framework (UiO-66) in the presence and absence of propane.
Figure 2:
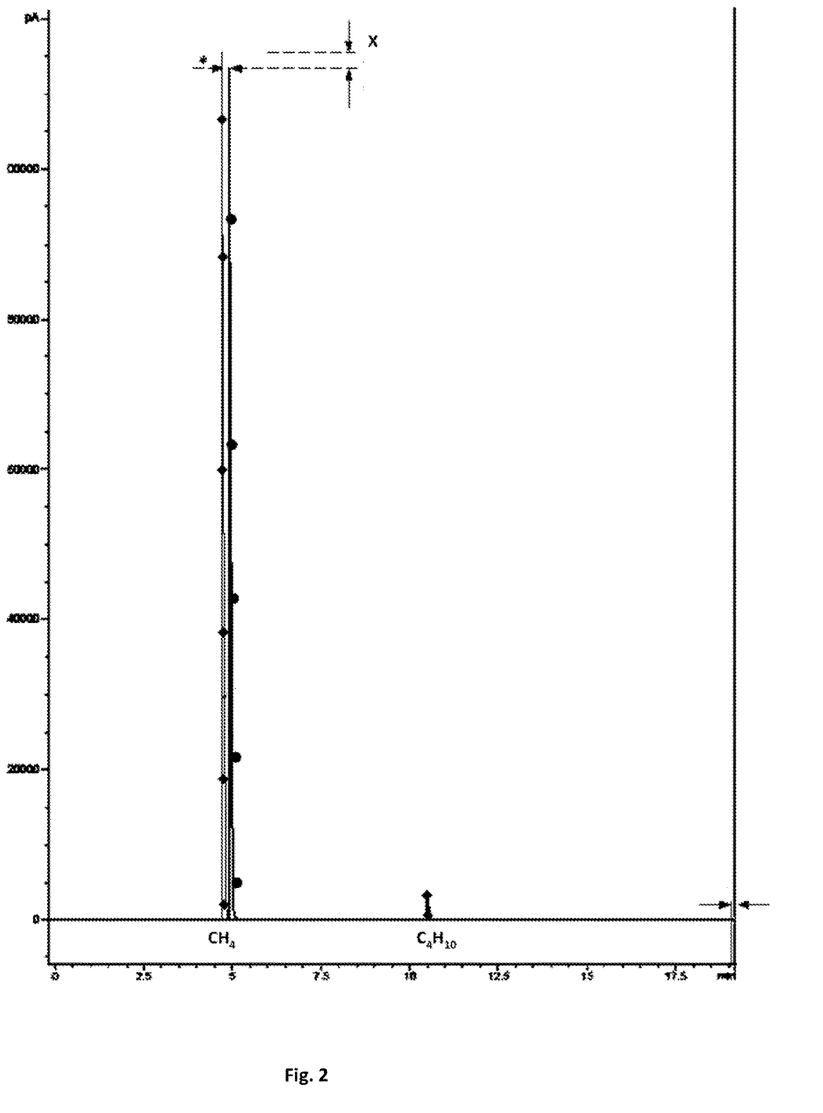
FIG. 2 is a GC chromatogram comparing desorbed methane from a metal organic framework (UiO-67) in the presence and absence of n-butane.

| UIO-66 (258.4 mg) | W[g] | GC Integration Area (GCIA) | | | Δ ΔGCIA CH$_4$ [A/A$_0$] (%) | Δ ΔW [W/W$_0$] (%) |
|---|---|---|---|---|---|---|
| | | Methane (CH$_4$) | Propane (C$_3$H$_8$) | n-butane (C$_4$H$_{10}$) | | |
| Desorbed 3 hrs at 120 deg C. Adsorbed (n-butane at 10 PSI and methane at 65 bar) | 92.2736 92.3591 | 435496 | 0 | 11733 | 7.11% | 0.09% | note 1:
the highest pressure of propane at room temperature and 1 atm pressure is 117 PSI note 2:
the highest pressure of n-butane at room temperature and 1 atm pressure is 20 PSI When the GC chromatograms are analyzed, it can be seen that besides the GC integration area or pA (peak area) difference, the intensity of the elution signals are also different in magnitude (labeled X FIG. 1 and FIG. 2). Specifically, the UIO-66 sorbent desorbed gas analysis shows that the pA intensities are different in magnitude indicating the difference in deliverable methane capacity with and without the use of propane gas. In FIG. 1, the diamond data points represent UiO-66 test with propane; the circular data points represent UiO-66 without propane. In FIG. 2, the diamond data points represent UiO-67 with n-butane; the circular data points represent UiO-67 without n-butane. Another interesting fact is the time difference between the eluted gas species when propane is used to enhance the methane uptake capacity of the MOF sorbent. FIG. 1 UIO-66 desorbed gas analysis with propane graph shows two peaks. The lesser retained, lighter methane molecules are eluted completely before the higher molecular weight propane gas is off-gassed from the MOF sorbent. Similarly, in FIG. 2, UIO-67's GC chromatogram shows an increase in deliverable methane capacity when n-butane is used to flush the sorption column before methane gas was introduced at 65 bar pressure. In addition, the elution time difference of different species is more evident when n-butane is used. This behavior is likely due to the higher molecular weight of n-butane when compared to propane and methane molecules. Lesser retained, more volatile and lighter weight molecules are eluted from the MOF sorbent faster before the molecules with less vapor pressure are released.

Below is set out the testing procedure regarding the lightweight gaseous hydrocarbons (e.g. $C_3$ and $C_4$ alkanes) and heavier-weight liquid hydrocarbons (e.g. $C_6$-$C_{10}$):

A. Gaseous Alkane ($C_3$ and $C_4$ Alkanes) Test Description:

Fluidic System Purge/Clean-up: Initially, before the hydrocarbon injection, the test system is purged with an inert gas to remove all the atmospheric impurities including water vapor. To accomplish the inert gas purge, the canister is purged with 50 psig UHP Nitrogen gas three times using the 3-way valve of the test set-up. At the end of the last purge, the needle valve of the test set-up is closed to seal the system from water vapor. Following the inert gas purge, the selected lightweight hydrocarbon (propane or n-butane) pressurized gas cylinder is connected to the 3-way valve inlet and the charger canister is filled with the test gas over atmospheric pressure to prevent contamination from outside. After the canister is charged, the 3-way valve flow is directed towards the purge line and the purge gas is replaced with the selected hydrocarbon gas in the test system.

Gaseous Alkane Injection: After purging the test system with the selected alkane gas ($C_3$ and $C_4$ alkanes), the test canister is charged to the selected gas pressure. The $C_3$ gas pressure is selected according to the maximum storage pressure of propane at ambient temperature and half of the amount of this test pressure. These values are 117 psig and 60 psig for propane gas and 20 and 10 psi for n-butane gas. After the test canister is charged to the desired test pressures, the gas is directed to the regenerated MOF sorbent while the system pressure drop—due to adsorption, is recorded. Following a 10-minute test duration, the test cell is disconnected from the test set-up and its weight gain—due to adsorption, is recorded.

High Pressure Methane Injection: Following the weight measurement of the test cell, it is re-connected to the test system for the last time for the high-pressure methane uptake step. After purging the test system with methane gas to remove the alkane gas impurities, the test canister is charged to the selected ANG test pressure (65 bar pressure). Following, the gas is directed to the alkane-loaded-MOF-sorbent while the system pressure drop—due to methane adsorption, is recorded. Immediately after a 10-minute test duration, the test cell is disconnected from the test set-up and its weight gain—due to methane adsorption, is recorded.

Gas Chromatography Measurements: Following the methane uptake test, the adsorbed gas is injected to a GC column integrated to a flame-ionization detector to measure the concentration of the methane gas desorbed from the test cell at ambient pressure.

B. Liquid Alkane (C6-C10 Alkanes) Test Description:

Fluidic System Purge/Clean-up: Initially, before the hydrocarbon injection, the test system is purged with an inert gas to remove all the atmospheric impurities including water vapor. Following the inert gas purge, the test system is sealed by a ball valve located in between the system and the test cell.

Liquid Alkane Injection: While the test cell is sealed, liquid alkane is injected directly to the headspace of the test cell. This volume is enough to store 120 microliters of the tested liquid alkane chemical. With the alkane in its headspace, the test cell is connected to the ball valve of the test system.

High Pressure Methane Injection: After purging the test system with methane gas to remove the alkane gas impurities, the test canister is charged to the selected ANG test pressure (65 bar pressure). Following, the gas is directed to the MOF sorbent while carrying the liquid alkane in its pathway. Immediately after a 10-minute test duration, the test cell is disconnected from the test set-up and its weight gain—due to methane adsorption, is recorded.

Gas Chromatography Measurements: Following the methane uptake test, the adsorbed gas is injected to a GC column integrated to a flame-ionization detector to measure the concentration of the methane gas desorbed from the test cell at ambient pressure.

C. Liquid Alkane (C6-C10 Alkanes) with Hydrogen Test Description:

Fluidic System Purge/Clean-up: Initially, before the hydrocarbon injection, the test system is purged with an inert gas to remove all the atmospheric impurities including water vapor. Following the inert gas purge, the test system is sealed by a ball valve located in between the system and the test cell.

Liquid Alkane Injection: While the test cell is sealed, liquid alkane is injected directly to the headspace of the test cell. This volume is enough to store 120 microliters of the tested liquid alkane chemical. With the alkane in its headspace, the test cell is connected to the ball valve of the test system.

High Pressure Methane Injection: After purging the test system with methane gas to remove the alkane gas impurities, the test canister is charged to the selected ANG test pressure (65 bar pressure). Following, the gas is directed to the MOF sorbent while carrying the liquid alkane in its pathway. Immediately after a 10-minute test duration, the test cell is disconnected from the test set-up and its weight gain—due to methane adsorption, is recorded. The hydrogen adsorption is determined by measuring the pressure drop in the test system due to hydrogen uptake of the MOF sorbent with and without the tested liquid alkane sorbent.

Example 2: Methane Uptake (n-Decane & PCN-250)

PCN-250 is a molecular organic framework described in international patent application no. PCT/GB2014/053506 (hereby incorporated by reference in its entirety). PCN-250 is a channel type MOF. Its synthesis is repeated here:

Synthesis of PCN-250 ($Fe_3$):

L22

L22 (10 mg), $Fe_3O(CH_3COO)_6$ (15 mg) and acetic acid (1 ml) in 2 mL of DMF were ultrasonically dissolved in a Pyrex vial. The mixture was heated in 140° C. oven for 12 h. After cooling down to room temperature, dark brown crystals were harvested by filtration (Yield. 80%).

The synthesis of L22 was carried out in accordance with Wang, X.-S.; Ma, S.; Rauch, K.; Simmons, J. M.; Yuan, D.; Wang, X.; Yildirim, T.; Cole, W. C.; Lopez, J. J.; de Meij ere, A.; Zhou, H.-C. Metal-organic frameworks based on double-bond-coupled di-isophthalate linkers with high hydrogen and methane uptakes, Chemistry of Materials 2008, 20, 3145 (hereby incorporated in its entirety by reference).

Figure 3:
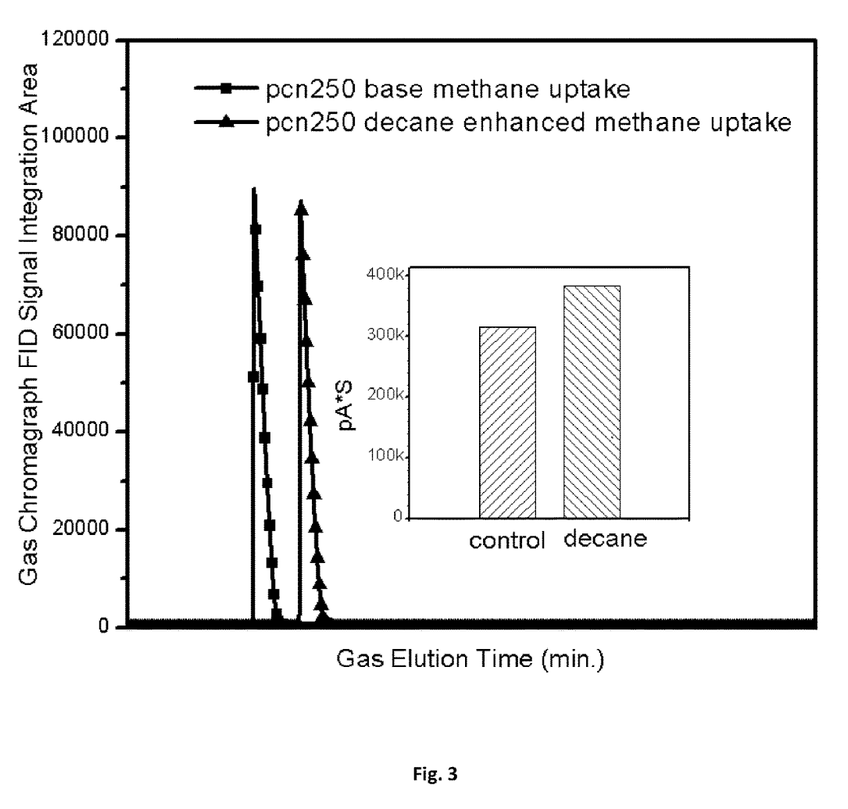
FIG. 3 is a graph showing methane absorption of PCN-250 with and without the use of n-decane.

The uptake of methane was measured using the test procedure B described above using PCN-250 as porous adsorbent material and n-decane as the hydrocarbon. The results are shown in FIG. 3. The control referred to in FIG. 3 is the same test procedure performed without the use of n-decane. The square data points represent methane uptake without n-decane. The triangular data points represent methane uptake using n-decane.

FIG. 3 demonstrates the improved methane adsorption observed when PCN-250 is employed as the porous adsorbent material in connection with n-decane as the hydrocarbon solvent. As seen in FIG. 3, a significant improvement in methane adsorption is observed.

Example 3: Methane Uptake (Cyclodecane & UiO-66)

UiO-66 is a zirconium molecular organic framework described in international patent application no. PCT/GB2009/001087—published as WO2009/133366 (hereby incorporated by reference in its entirety). UiO-66 is a cage type MOF.

Figure 4:
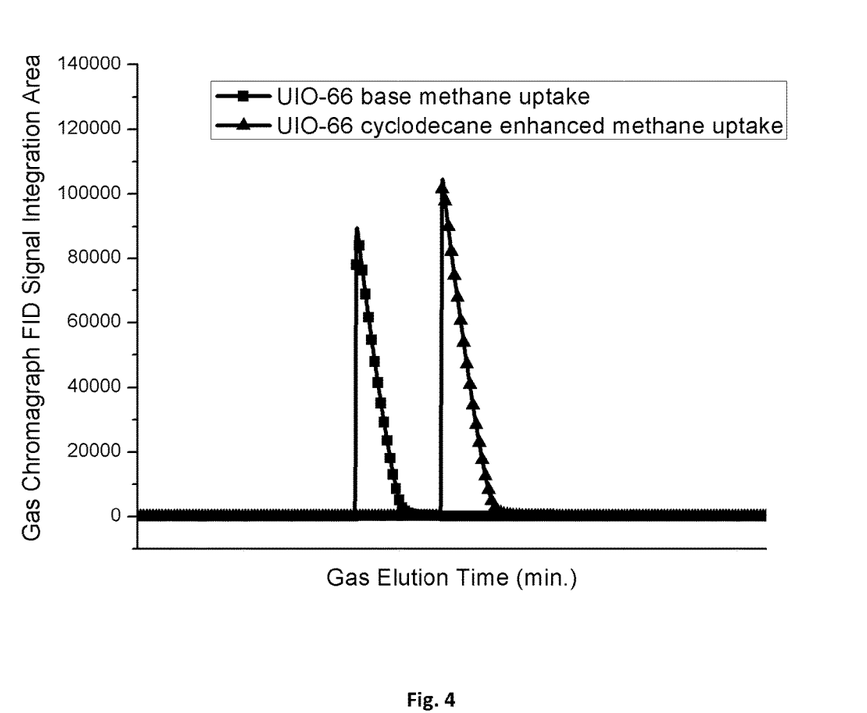
FIG. 4 is a graph showing methane absorption of UiO-66 with and without the use of cyclodecane.

The uptake of methane was measured using the test procedure B described above using UiO-66 as porous adsorbent material and cyclodecane as the hydrocarbon. The results are shown in FIG. 4. The square data points represent methane uptake without cyclodecane. The triangular data points represent methane uptake with cyclodecane.

FIG. 4 demonstrates the improved methane adsorption observed when UiO-66 is used as the porous adsorbent material and cyclo-decane is employed as the hydrocarbon. As seen from FIG. 4, a significant increase in methane adsorption is observed.

Example 4: Methane Uptake (n-Dodecane & PCN-777)

PCN-777 is zirconium containing molecular organic framework described by Feng et al in Angew. Chem. Int. Ed. 2014, 53, 1-7 (hereby incorporated by reference in its entirety). PCN-777 is a channel type MOF.

Figure 5:
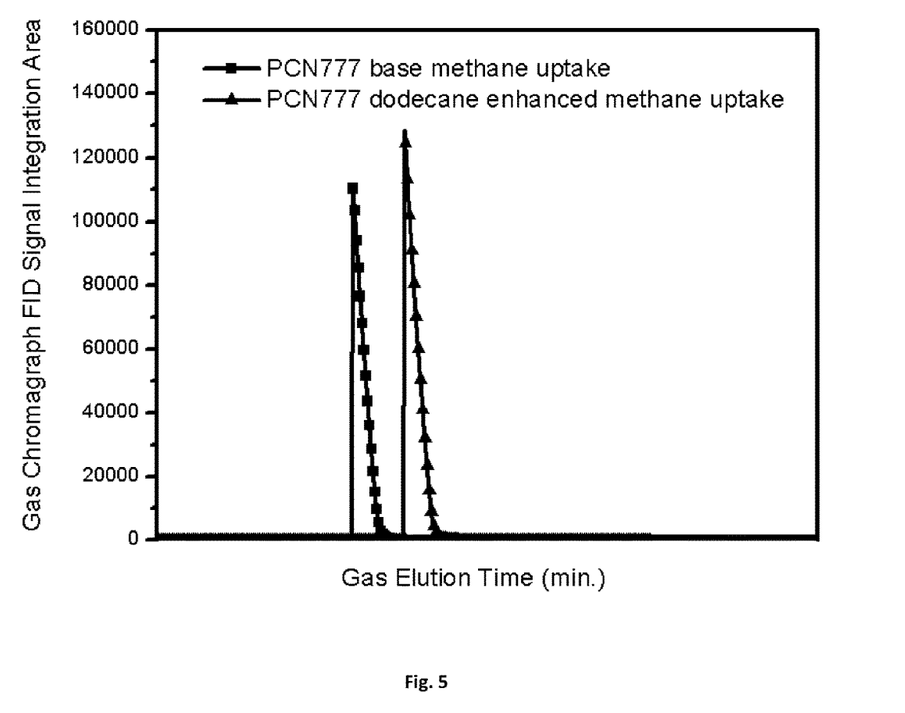
FIG. 5 is a graph showing methane absorption of PCN-777 with and without the use of n-dodecane.

The uptake of methane was measured using the test procedure B described above using PCN-777 as porous adsorbent material and n-dodecane as the hydrocarbon. The results are shown in FIG. 5. The square data points represent methane uptake without n-dodecane. The triangular data points represent methane uptake using n-dodecane.

FIG. 5 demonstrates the improved methane adsorption observed when PCN-777 is employed as the porous adsorbent material and dodecane is employed as the hydrocarbon. As seen in FIG. 5, a significant increase in methane adsorption is observed.

Example 5: Methane Uptake (Propane & UiO-66)

Figure 6:
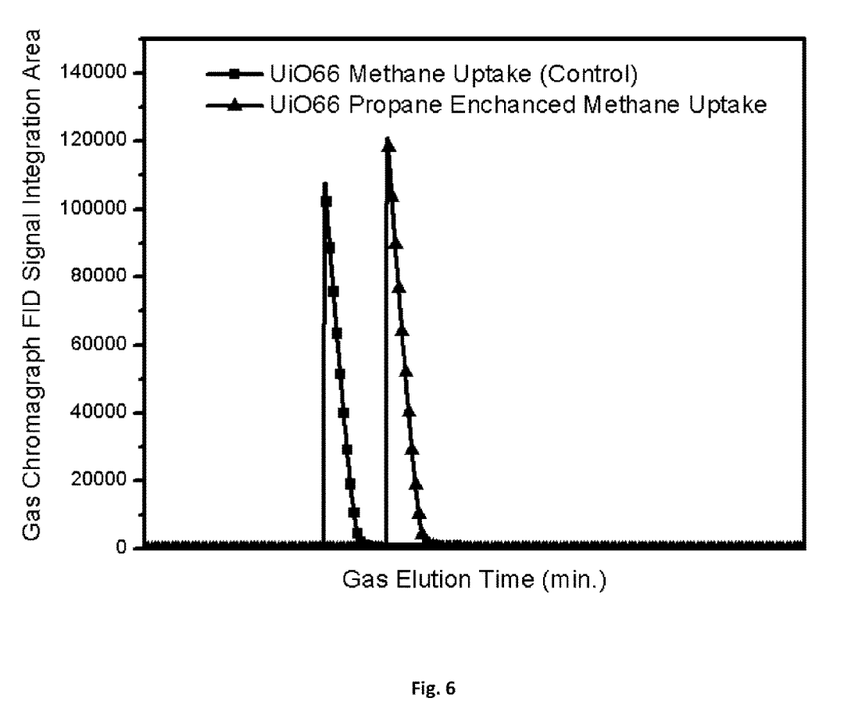
FIG. 6 is a graph showing methane absorption of UiO-66 with and without the use of propane.
Figure 7A:
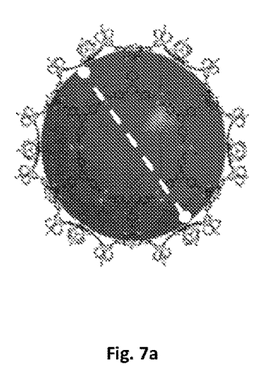
FIGS. 7a-7c illustrate the meanings of the terms "free diameter", "pore opening", and "pore volume". The term "void volume" is employed to mean the pore volume minus trapped solvent volume.
Figure 7B:
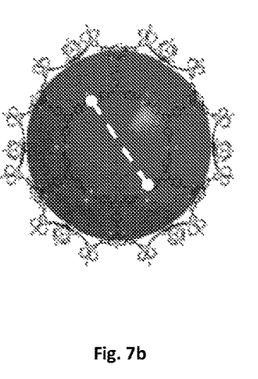
Figure 7C:
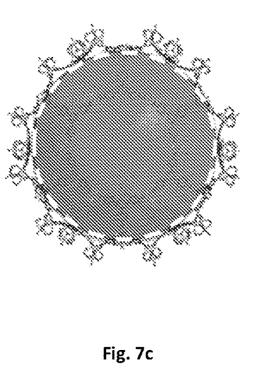

The uptake of methane was measured using the test procedure A described above using UiO-66 as porous adsorbent material and propane as the hydrocarbon. The results are shown in FIG. 6. The square data points represent methane uptake without propane (i.e. the control). The triangular data points represent methane uptake using propane.

FIG. 6 demonstrates the improved methane adsorption observed when UiO-66 is employed as the porous adsorbent material and propane is employed as the hydrocarbon. As seen in FIG. 6, a significant increase in methane adsorption is observed.

The invention claimed is:

1. A method of storing a solution of methane and a C2-C30 hydrocarbon, the method comprising:
    mixing gaseous methane and a C2-C30 hydrocarbon to provide a mixture of methane and C2-C30 hydrocarbon, wherein the mixture comprises greater than or equal to about 50 mole percent of methane;

maintaining the mixture of methane and C2-C30 hydrocarbon as a liquid solution at a pressure of 30 to 150 bar within a storage vessel, wherein the storage vessel comprises a porous adsorbent framework, and wherein the porous adsorbent framework is a metal organic framework.

2. The method according to claim 1, wherein the solution of methane and C2-C30 hydrocarbon is adsorbed in the porous adsorbent material.

3. The method according to claim 1, wherein mixing gaseous methane and a C2-C30 hydrocarbon comprises feeding a C2-C30 hydrocarbon into the storage vessel comprising the porous adsorbent framework, and then feeding methane into the storage vessel to produce a mixture of methane and C2-C30 hydrocarbon.

4. The method according to claim 1, wherein mixing gaseous methane and a C2-C30 hydrocarbon is carried out before the mixture of methane and C2-C30 hydrocarbon is fed into the storage vessel.

5. The method according to claim 1, wherein the mixture of methane and C2-C30 hydrocarbon comprises from about 50 to about 80 mole percent of methane, and wherein the solution of methane and C2-C30 hydrocarbon is maintained at a pressure below the vapour pressure of the C2-C30 hydrocarbon.

6. The method according to claim 1, wherein the C2-C30 hydrocarbon is fed into the storage vessel at a pressure below the vapour pressure of the C2-C30 hydrocarbon.

7. The method according to claim 1, further comprising releasing the methane from the storage vessel.

8. The method according to claim 7, wherein the methane is released without releasing the C2-C30 hydrocarbon from the storage vessel.

9. The method according to claim 8, wherein the methane is released to a pressure of about atmospheric pressure to 5 bar pressure.

10. The method according to claim 1, wherein the metal organic framework comprises molecular pores having a pore diameter of over 3.8 Angstroms.

11. The method according to claim 1, wherein the metal organic framework comprises bi-, tri-, or tetra-carboxylate ligands.

12. The method according to claim 11, wherein the metal organic framework is UiO-66, UiO-67, PCN-250 or PCN-777.

13. The method according to claim 1, wherein the C2-C30 hydrocarbon is propane and optionally the propane is fed to the storage vessel at a pressure of less than 117 psi, less than or equal to 100 psi, less than or equal to 80 psi, or less than or equal to 60 psi; or wherein the C2-C30 hydrocarbon is n-butane and optionally the n-butane is fed to the storage vessel at a pressure of less than 20 psi, less than or equal to 15 psi, less than or equal to 12 psi, or less than or equal to 10 psi; or wherein C2-C30 hydrocarbon is n-hexane and optionally the n-hexane is fed to the storage vessel at a volume of less than 120 μL, less than or equal to 60 μL, less than or equal to 30 μL; or wherein the C2-C30 hydrocarbon is n-octane and optionally the n-octane is fed to the storage vessel at a volume of less than 120 μL, less than or equal to 60 μL, less than or equal to 30 μL; or wherein the C2-C30 hydrocarbon is n-decane and optionally the n-decane is fed to the storage vessel at a volume of less than 120 μL, less than or equal to 60 μL, less than or equal to 30 μL; or wherein the C2-C30 hydrocarbon is cyclodecane and optionally the cyclodecane is fed to the storage vessel at a volume of less than 120 μL, less than or equal to 60 μL, less than or equal to 30 μL.

14. The method according to claim 1, wherein the hydrocarbon is a C2-C10 hydrocarbon.

15. A method of storing a solution of hydrogen and a C2-C30 hydrocarbon, the method comprising:

mixing gaseous hydrogen and a C2-C30 hydrocarbon to provide a mixture of hydrogen and C2-C30 hydrocarbon, wherein the mixture comprises greater than or equal to about 50 mole percent of hydrogen;

maintaining the mixture of hydrogen and C2-C30 hydrocarbon as a liquid solution at a pressure of 30 to 150 bar within a storage vessel, wherein the storage vessel comprises a porous adsorbent framework, and wherein the porous adsorbent framework is a metal organic framework.

16. The method according to claim 15, further comprising releasing the hydrogen from the storage vessel.

17. The method according to claim 16, wherein the hydrogen is released without releasing the C2-C30 hydrocarbon from the storage vessel.

18. The method according to claim 15, wherein the metal organic framework comprises molecular pores having a pore diameter of over 3.8 Angstroms.

19. The method according to claim 15, wherein the C2-C30 hydrocarbon is propane and optionally the propane is fed to the storage vessel at a pressure of less than 117 psi, less than or equal to 100 psi, less than or equal to 80 psi, or less than or equal to 60 psi.

20. A method for storing a solution of carbon dioxide or nitrogen and a C2-C30 hydrocarbon, the method comprising:

mixing gaseous carbon dioxide or nitrogen and a C2-C30 hydrocarbon to provide a mixture of carbon dioxide or nitrogen and C2-C30 hydrocarbon, wherein the mixture comprises greater than or equal to about 50 mole percent of carbon dioxide or nitrogen;

maintaining the mixture of carbon dioxide or nitrogen and C2-C30 hydrocarbon as a liquid solution at a pressure of 30 to 150 bar within a storage vessel, wherein the storage vessel comprises a porous adsorbent framework, and wherein the porous adsorbent framework is a metal organic framework.

* * * * *